US008095989B2

(12) United States Patent
Levy

(10) Patent No.: US 8,095,989 B2
(45) Date of Patent: *Jan. 10, 2012

(54) ASSOCIATING FIRST AND SECOND WATERMARKS WITH AUDIO OR VIDEO CONTENT

(75) Inventor: Kenneth L. Levy, Stevenson, WA (US)

(73) Assignee: Digimarc Corporation, Beaverton, OR (US)

(*) Notice: Subject to any disclaimer, the term of this patent is extended or adjusted under 35 U.S.C. 154(b) by 45 days.

This patent is subject to a terminal disclaimer.

(21) Appl. No.: 12/750,487

(22) Filed: Mar. 30, 2010

(65) Prior Publication Data
US 2010/0313278 A1    Dec. 9, 2010

Related U.S. Application Data

(63) Continuation of application No. 11/551,607, filed on Oct. 20, 2006, now Pat. No. 7,690,041, which is a continuation of application No. 09/801,515, filed on Mar. 7, 2001, now Pat. No. 7,127,744.

(60) Provisional application No. 60/188,462, filed on Mar. 10, 2000.

(51) Int. Cl.
H04L 9/00    (2006.01)

(52) U.S. Cl. ............... 726/26; 726/27; 726/31; 713/176

(58) Field of Classification Search .............. 726/26–27, 726/30–31; 713/176; 380/54, 200–203; 382/100; 705/57–59
See application file for complete search history.

(56) References Cited

U.S. PATENT DOCUMENTS 4,238,849 A    12/1980  Gassman
4,807,031 A     2/1989  Broughton
5,410,598 A     4/1995  Shear
5,450,490 A     9/1995  Jensen et al.
5,459,583 A    10/1995  Nakata
5,481,294 A     1/1996  Thomas et al.
5,526,427 A     6/1996  Thomas et al.
5,579,124 A    11/1996  Aijala et al.
5,606,609 A     2/1997  Houser et al.
5,629,980 A     5/1997  Stefik et al.

(Continued)

FOREIGN PATENT DOCUMENTS

EP    1077570    2/2001

(Continued)

OTHER PUBLICATIONS

Jul. 27, 2005, Office Action from assignee's U.S. Appl. No. 10/017,678 (published as US 2002-0090114 A1) and Jul. 29, 2005; Amendment in response thereto.

(Continued)

Primary Examiner — Hosuk Song

(57) ABSTRACT

The present invention relates generally to processing audio or video content. One claim recites an apparatus comprising: electronic memory, and an electronic logic processor. The electronic memory is for storing data representing audio or video content, in which the data includes a protect watermark embedded therein, the protect watermark providing an indication that the data is protected, and in which the data further includes a rights watermark embedded in the data, the right watermark providing an indication of user rights associated with rendering the audio or video content, the protect watermark being more difficult to remove from the data relative to the rights watermark. The electronic logic processor is programmed for analyzing the data to retrieve the protect watermark only when the rights watermark does not exist in the data. Other claims are described and provided as well.

20 Claims, 1 Drawing Sheet

U.S. PATENT DOCUMENTS

| | | | |
|---|---|---|---|
| 5,721,788 A | 2/1998 | Powell et al. |
| 5,748,763 A | 5/1998 | Rhoads |
| 5,765,152 A | 6/1998 | Erickson |
| 5,822,436 A | 10/1998 | Rhoads |
| 5,841,978 A | 11/1998 | Rhoads |
| 5,845,281 A | 12/1998 | Benson et al. |
| 5,862,260 A | 1/1999 | Rhoads |
| 5,875,249 A | 2/1999 | Mintzer et al. |
| 5,905,800 A | 5/1999 | Moskowitz et al. |
| 5,910,987 A | 6/1999 | Ginter et al. |
| 5,912,972 A | 6/1999 | Barton |
| 5,930,369 A | 7/1999 | Cox et al. |
| 5,940,134 A | 8/1999 | Wirtz |
| 5,943,422 A | 8/1999 | Van Wie et al. |
| 5,963,909 A | 10/1999 | Warren et al. |
| 5,991,500 A | 11/1999 | Kanota et al. |
| 5,991,876 A | 11/1999 | Johnson et al. |
| 6,021,196 A | 2/2000 | Sandford et al. |
| 6,031,815 A | 2/2000 | Heemskerk |
| 6,044,182 A | 3/2000 | Daly et al. |
| 6,049,627 A | 4/2000 | Becker et al. |
| 6,061,793 A | 5/2000 | Tewfik et al. |
| 6,112,008 A | 8/2000 | Sugita et al. |
| 6,122,403 A | 9/2000 | Rhoads |
| 6,131,161 A | 10/2000 | Linnartz |
| 6,141,753 A | 10/2000 | Zhao et al. |
| 6,185,683 B1 | 2/2001 | Ginter et al. |
| 6,209,092 B1 | 3/2001 | Linnartz |
| 6,226,387 B1 | 5/2001 | Tewfik et al. |
| 6,229,924 B1 | 5/2001 | Rhoads et al. |
| 6,230,268 B1 | 5/2001 | Miwa et al. |
| 6,233,347 B1 | 5/2001 | Chen et al. |
| 6,233,684 B1 | 5/2001 | Stefik et al. |
| 6,240,121 B1 * | 5/2001 | Senoh ............... 375/130 |
| 6,246,775 B1 | 6/2001 | Nakamura et al. |
| 6,272,176 B1 | 8/2001 | Srinivasan |
| 6,272,634 B1 | 8/2001 | Tewfik et al. |
| 6,278,792 B1 | 8/2001 | Cox et al. |
| 6,282,654 B1 | 8/2001 | Ikeda et al. |
| 6,285,776 B1 | 9/2001 | Rhoads |
| 6,311,214 B1 | 10/2001 | Rhoads |
| 6,314,192 B1 * | 11/2001 | Chen et al. ............... 382/100 |
| 6,314,518 B1 | 11/2001 | Linnartz |
| 6,332,194 B1 | 12/2001 | Bloom et al. |
| 6,334,187 B1 | 12/2001 | Kadono |
| 6,342,924 B1 | 1/2002 | Ikeda et al. |
| 6,370,319 B1 | 4/2002 | Matsumoto et al. |
| 6,374,036 B1 | 4/2002 | Ryan et al. |
| 6,398,245 B1 | 6/2002 | Gruse et al. |
| 6,418,232 B1 | 7/2002 | Nakano et al. |
| 6,421,450 B2 | 7/2002 | Nakano |
| 6,425,081 B1 | 7/2002 | Iwamura |
| 6,427,012 B1 | 7/2002 | Petrovic |
| 6,430,301 B1 | 8/2002 | Petrovic |
| 6,433,946 B2 | 8/2002 | Ogino |
| 6,434,322 B1 | 8/2002 | Kimura et al. |
| 6,437,933 B1 | 8/2002 | Sugiyama et al. |
| 6,449,367 B2 | 9/2002 | Van Wie et al. |
| 6,449,425 B1 | 9/2002 | Ogino |
| 6,456,726 B1 | 9/2002 | Yu et al. |
| 6,473,560 B1 | 10/2002 | Linnartz et al. |
| 6,505,223 B1 | 1/2003 | Haitsma et al. |
| 6,526,510 B1 | 2/2003 | Kori et al. |
| 6,530,021 B1 | 3/2003 | Epstein et al. |
| 6,535,614 B1 | 3/2003 | Kimura et al. |
| 6,560,349 B1 | 5/2003 | Rhoads |
| 6,571,220 B1 | 5/2003 | Ogino et al. |
| 6,580,806 B1 | 6/2003 | Sato |
| 6,590,997 B2 | 7/2003 | Rhoads |
| 6,591,365 B1 | 7/2003 | Cookson |
| 6,601,046 B1 | 7/2003 | Epstein |
| 6,633,723 B1 | 10/2003 | Kuroda et al. |
| 6,636,551 B1 | 10/2003 | Ikeda et al. |
| 6,662,198 B2 | 12/2003 | Satyanarayanan et al. |
| 6,674,858 B1 | 1/2004 | Kimura et al. |
| 6,674,876 B1 | 1/2004 | Hannigan et al. |
| 6,687,802 B1 | 2/2004 | Kori et al. |
| 6,707,774 B1 | 3/2004 | Kuroda et al. |
| 6,721,437 B1 | 4/2004 | Ezaki et al. |
| 6,728,390 B2 | 4/2004 | Rhoads et al. |
| 6,744,906 B2 | 6/2004 | Rhoads et al. |
| 6,807,534 B1 | 10/2004 | Erickson |
| 6,829,368 B2 | 12/2004 | Meyer et al. |
| 6,834,308 B1 | 12/2004 | Ikezoye et al. |
| 6,868,497 B1 | 3/2005 | Levy |
| 6,871,180 B1 | 3/2005 | Neuhauser et al. |
| 6,882,728 B1 | 4/2005 | Takahashi et al. |
| 6,987,862 B2 | 1/2006 | Rhoads |
| 7,010,144 B1 | 3/2006 | Davis et al. |
| 7,020,304 B2 | 3/2006 | Alattar et al. |
| 7,035,427 B2 | 4/2006 | Rhoads |
| 7,046,808 B1 | 5/2006 | Metois et al. |
| 7,050,603 B2 | 5/2006 | Rhoads et al. |
| 7,055,034 B1 | 5/2006 | Levy |
| 7,127,744 B2 | 10/2006 | Levy |
| 7,248,717 B2 | 7/2007 | Rhoads |
| 7,266,704 B2 | 9/2007 | Levy |
| 7,372,976 B2 | 5/2008 | Rhoads et al. |
| 7,499,566 B2 | 3/2009 | Rhoads |
| 7,555,785 B2 | 6/2009 | Levy |
| 7,593,576 B2 | 9/2009 | Meyer et al. |
| 7,650,009 B2 | 1/2010 | Rhoads |
| 7,689,532 B1 | 3/2010 | Levy |
| 7,690,041 B2 * | 3/2010 | Levy ............... 726/26 |
| 7,756,892 B2 | 7/2010 | Levy |
| 7,792,325 B2 | 9/2010 | Rhoads et al. |
| 7,953,270 B2 | 5/2011 | Rhoads |
| 7,965,863 B2 | 6/2011 | Jones |
| 8,005,254 B2 | 8/2011 | Rhoads |
| 2001/0021144 A1 | 9/2001 | Oshima et al. |
| 2001/0024510 A1 | 9/2001 | Iwamura |
| 2001/0028727 A1 | 10/2001 | Naito et al. |
| 2001/0047478 A1 | 11/2001 | Mase |
| 2001/0051996 A1 | 12/2001 | Cooper et al. |
| 2001/0052076 A1 | 12/2001 | Kadono |
| 2002/0033844 A1 | 3/2002 | Levy et al. |
| 2002/0059580 A1 | 5/2002 | Kalker et al. |
| 2002/0067914 A1 | 6/2002 | Schumann et al. |
| 2002/0097873 A1 | 7/2002 | Petrovic |
| 2002/0122567 A1 | 9/2002 | Kuzmich et al. |
| 2002/0156742 A1 | 10/2002 | Ogino et al. |
| 2002/0181732 A1 | 12/2002 | Safavi-Naini et al. |
| 2003/0009669 A1 | 1/2003 | White et al. |
| 2003/0112974 A1 | 6/2003 | Levy |
| 2004/0059581 A1 | 3/2004 | Kirovski et al. |
| 2004/0169581 A1 | 9/2004 | Petrovic et al. |
| 2004/0240846 A1 | 12/2004 | Cookson et al. |
| 2005/0065890 A1 | 3/2005 | Benaloh |

FOREIGN PATENT DOCUMENTS

| | | |
|---|---|---|
| EP | 1223742 | 7/2002 |
| WO | WO01/05075 | 1/2001 |
| WO | WO01/39121 | 5/2001 |
| WO | WO01/61508 | 8/2001 |
| WO | WO02/07442 | 1/2002 |
| WO | WO02/19589 | 3/2002 |

OTHER PUBLICATIONS

Subset of allowed claims and Sep. 7, 2005, Notice of Allowance and Issue Fee Due, each from Assignee's U.S. Appl. No. 10/017,678.

U.S. Appl. No. 60/116,641, filed Jan. 21, 1999, Cookson.

U.S. Appl. No. 09/636,102, Ramos et al, filed Aug. 10, 2000.

Craver et al., "Can Invisible Watermarks Resolve Rightful Ownerships?" IBM Technical Report RC 20509, Jul. 25, 1996, pp. 1-21. (also published Proc. SPIE—Int. Soc. Opt. Eng. vol. 3022, pp. 310-321, conf. Feb. 13-14, 1997).

Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.

Response to CfP for Technology Solutions to Screen Digital Audio Content for LCM Acceptance, NTT Waveless Radio Consotium, May 23, 1999, 9 pages.

Microsoft Response to CfP for Technology Solutions to Screen Digital Audio Content for LCM Acceptance, SDMI, PDWG Tokyo, May 23, 1999, 9 pages.

Audio Watermarking Architectures for Secure Digital Music Distribution. A Proposal to the SDMI Portable Devices Working Group by ARIS Technologies, Inc, Mar. 26, 1999, pp. 1-9.

Audio Watermarking Architectures for Persistent Protection, Presentation to SDMI PDWG, Mar. 29, 1999, pp. 1-16.

Audio Watermarking System to Screen Digital Audio Content for LCM Acceptance, A Proposal Submitted in Response to PDWG99050504-Transition CfP by ARIS Technologies, Inc., May 23, 1999, Document Version 1.0, 15 pages.

Thomas, Keith, Screening Technology for Content from Compact Discs, May 24, 1999, 11 pages.

Cookson, Chris, General Principles of Music Uses on Portable Devices, presented to SDMI, Mar. 5, 1999, pp. 1-4.

NEC Data Hiding Proposal, Response to Call for Proposal Issued by the Data Hiding SubGroup, Copy Protection Technical Working Group, Oct. 1997.

Philips Electronics, Response to Call for Proposals Issued by the Data Hiding SubGroup, Copy Protection Technical Working Group, 1997.

Digital Audio Screening Technology for Phased Rollout, Version 1.00, Philips Research, Liquid Audio, Fraunhofer Institute, May 1999.

Pierce et al, "Interim Report, Results of Phases I and II, Issued by the Data Hiding Subgroup, Copy Protection Technical Working Group," May 1998.

"AIPL Greyhound Overview," Hand-out distributed at meeting of Secure Digital Music Initiative, Mar. 29, 1999, 1 page.

"AIPL's Copy Management System," distributed on or after Oct. 1999, 5 pages.

AIPL, "Our Proposal for SDMI's Short-Term Objective," privately distributed, Mar. 11, 1999. 9 pages.

* cited by examiner

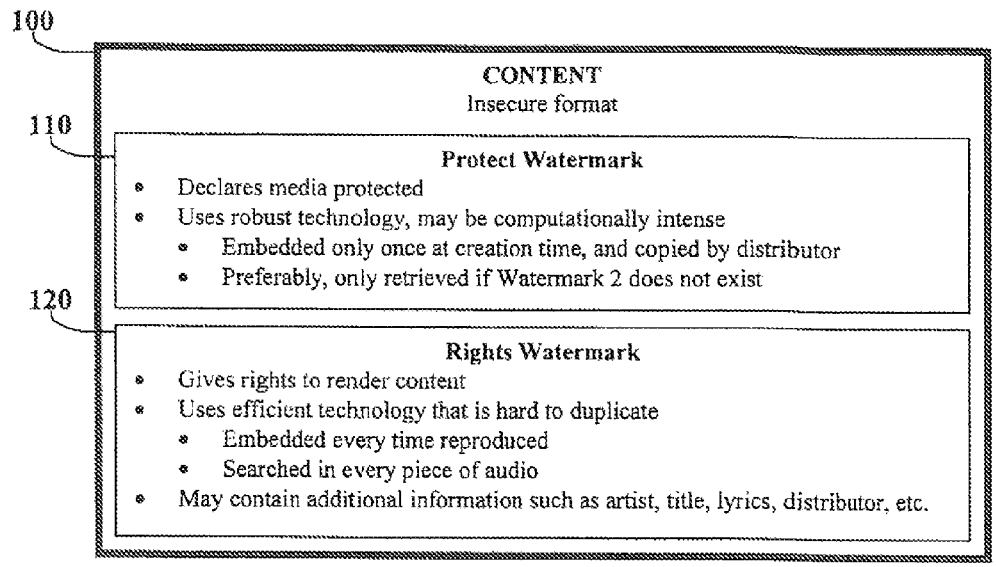
Fig. 1
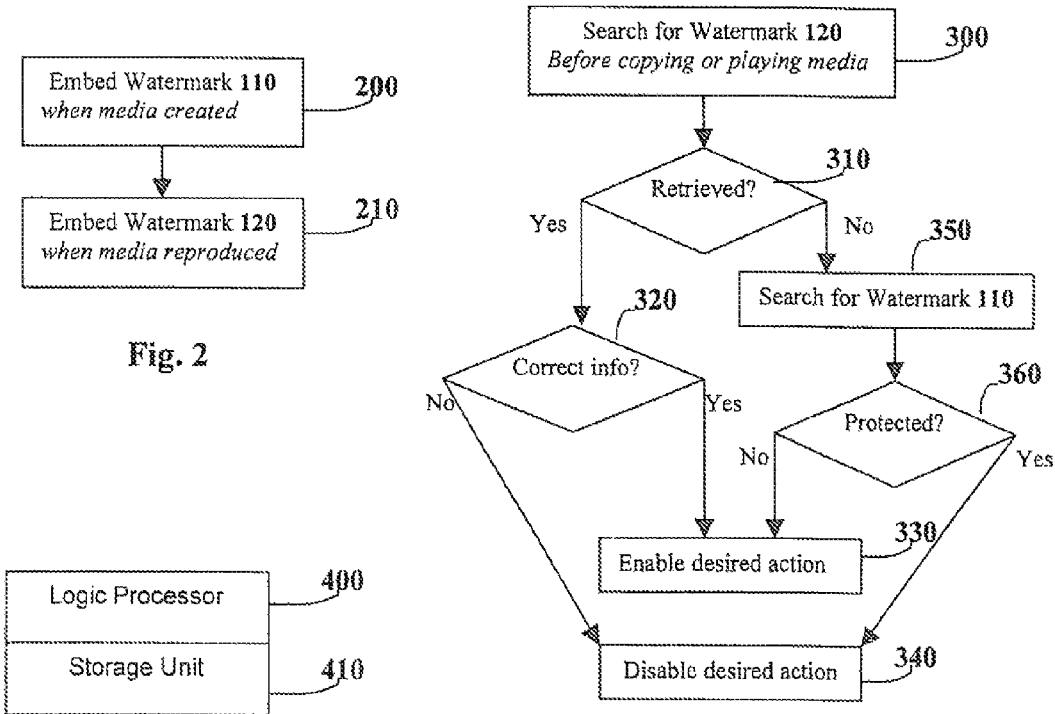
Fig. 2
Fig. 4
Fig. 3

ASSOCIATING FIRST AND SECOND WATERMARKS WITH AUDIO OR VIDEO CONTENT

This application is a continuation of U.S. patent application Ser. No. 11/551,607, filed Oct. 20, 2006 (U.S. Pat. No. 7,690,041), which is a continuation of U.S. patent application Ser. No. 09/801,515, filed Mar. 7, 2001 (U.S. Pat. No. 7,127,744), which claims the benefit of U.S. Provisional Patent Application No. 60/188,462, filed Mar. 10, 2000. These patent documents are hereby incorporated herein by reference.

TECHNICAL FIELD

This invention relates to the field of embedded data, known as watermarks, and copy control for media.

BACKGROUND OF THE INVENTION

Digital content, including audio, video, images, multimedia, etc., is easy to copy and expensive to create. Thus, it is a great target for illegal distribution, defined as piracy. Currently, this piracy is occurring with audio, using MPEG-1 Layer 3 (MP3) bit-rate compression format and the Internet. The MP3 format is used by new artist who want their music freely distributed, as well as by people transforming CD audio into MP3 and possibly illegally distributing it on the Internet. Professional artists and record labels want to stop the second action while allowing the first, and even distribute new content in MP3.

The problem with robust embedded data based methods of protecting content in this insecure format is that they are computationally intense. The prior-art describes numerous examples of such methods using embedded data (a.k.a. watermarks or steganography) that require frequency transformations. Assuming a different watermark is required for each user, player, storage unit and/or content, distributors will need expensive equipment to protect the data and users will require expensive devices to render the content.

The problem with efficient embedded data methods used to protect the content in this insecure format is that they are easy to remove, even though they can be made robust to duplication, such as utility patent application Ser. No. 09/404,291 (U.S. Pat. No. 7,055,034) entitled "Method and apparatus for robust embedded data" submitted on Sep. 23, 1999 by Levy, included herein by reference. Removal of embedded data is not a problem if you require the content to contain the embedded data in order to be rendered, but this concept only works in a secure format. In other words, in an insecure format, if the embedded data that informs the rendering device that the content can or cannot be played is removed, the content can always be played. However, with a secure format, removal of the embedded data that informs the rendering device that the content can or cannot be played leaves the content useless since the device cannot render, such as decrypt, the content without this embedded authorization. For example, in MP3, an insecure format where there is a desire to freely distribute content without protection, the removal of the watermark creates useful pirated content.

Cryptology can also be used to secure the content. However, not only is this technique computationally intense since it requires many operations using a large number of bits, but also one can argue that the format has been changed since existing players cannot play the protected content.

SUMMARY OF THE INVENTION

This object of this novel process is to efficiently protect content in an insecure format using two different layers of embedding data (referred to as watermarks for ease of understanding).

One watermark is robust and declares that the content is protected. This watermark is embedded when the content is created in the desired format, such as MP3, CD or DVD. This means that the computational intensity of adding the watermark is not an issue because the watermark is only added to the audio once, and copied with the audio by the distributor. This watermark is labeled the Protect watermark.

The other watermark gives the content its rights, i.e. declares that it is okay to play or record the content. It is efficient, and does not need to be difficult to removal, since removing it produces no advantageous results. The efficiency of this watermark is desirable since it must be embedded each time the audio reproduced, such as downloaded on the Internet, possibly to link the content to the user, player, recorder and/or storage device. Thus, it greatly reduces the cost of copy management for the distributor. In addition, it lowers the cost of the portable players, since they only have to find this efficient watermark. This watermark is labeled the Rights Watermark.

To this end, it is desirable to use different types of watermark for each layer and not two different layers of one watermarking technique. For example, it is not desirable to use one watermarking technique where one layer is embedded at a low-level, thus being fragile, and another layer is embedded at a higher-level, thus being robust.

Importantly, non-protected content may contain neither watermark and can be rendered by any device from any storage. Thus, the rendering devices can be both forward and backwards compatible.

The invented apparatus, which implements the described process, includes an analog or digital logic processor and a storage unit, such a random access memory.

BRIEF DESCRIPTION OF THE DRAWINGS

FIG. 1 is an overview of the process of using two watermarks to protect content in an insecure format with minimal increase in computational complexity, and thus cost.

FIG. 2 displays the pseudocode for the embedding process.

FIG. 3 displays the pseudocode for the retrieving process.

FIG. 4 displays the apparatus.

DETAILED DESCRIPTION

This invention begins by explaining the terminology. Content refers to the data, including but not limited to audio, video, images and smells. Storage refers to device that stores the data. The term watermark refers to any system of embedding data that is minimally perceived when the content is played, and is also known as steganography. Data embedded in the header, and not hidden within the content is still considered a watermark. Robust methods are difficult to bypass. A pirate is an individual who attempts to illegally copy or distribute the content.

FIG. 1 displays an overview of the invented process. Content 100 exists in an insecure format, which means that non-compliant devices, i.e. devices ignoring copy protection rules, can render the content even if the content declares itself as non-renderable. An intrinsic benefit of an insecure format is that legacy devices, i.e. device created before the copy protection system was defined, can render the protected content. In other words, the system is backwards and forwards compatible. An example of an insecure format is MP3. Some artists wish to freely distribute their content in this format. However, there are other interested parties who want to distribute their content in the same format without allowing it to be freely copied and redistributed.

The protect watermark 110 declares that the content is protected. The protect watermark 110 must be extremely difficult to remove, and, accordingly, may be computationally intense. Many existing watermark methods meet this description, and future ones will certainly be designed. The rights watermark 120 gives the user rights to render the content. This watermark may link the content to the user, player, recorder and/or storage device. This link would determine if the user may copy and/or play the content. The rights watermark 120 must be a computationally efficient method that is hard to duplicate. Currently, Levy's application, as referenced above, describes how to design embedded data that is hard to duplicate, i.e. transfer between content to give rights to content that should not include these rights. However, it is expected that more duplication resistant watermarks will be produced in the future.

Both watermarks are embedded and retrieved at different times in the reproduction process, as shown in FIGS. 1, 2 and 3. The protect watermark 110 is embedded when the audio is created, and copied with the audio when distributed. In addition, the protect watermark 110 is only retrieved when the rights watermark 120 does not exist in the content. Thus, the computational intensity of adding the watermark is not that important.

The rights watermark 120 is embedded when the content is reproduced, such as being distributed, placed on permanent storage, or encoded to an alternative form by a personal encoding device. The term reproduced refers to the legal transformation or distribution of the content, whereas copying refers to an individual producing an exact bit-for-bit replication of the content for legal or illegal utilization. Since rights watermark 120 is embedded every time the content is reproduced, its efficiency creates a useful reduction in cost for the supporting hardware. Since the rights watermark 120 is embedded after watermark 110 it must be okay to layer the watermarks, as known to be possible with existing technology.

Optimally, the watermarks are search and retrieved in a specific order, as shown in FIGS. 1 and 3. First, the content is searched for rights watermark 120 (box 300). If rights watermark 120 is retrieved (box 310) the embedded information is evaluated (box 320). If the embedded information is correct, the desired action is enabled (box 330). Alternatively, if the embedded information is not correct, the desired action is disabled (box 340). Only if rights watermark 120 is not found does the content need to be searched for the computationally intense protect watermark 110 (box 350). If protect watermark 110 declares the content protected, then the desired action is disabled (box 340), otherwise the desire action is allowed (box 330).

When using a rendering device, such as a MP3 player, which has a portable section, the watermark processing tasks can be split between the loader; potentially a PC program, and the portable section. The split can be designed such that the portable section never needs to retrieve the protect watermark, thus reducing the price of the consumer electronics portable player by reducing required processing power in this portable section. For example, when loading the content to the portable section, the loader can check for the rights watermark and the protect watermark, if necessary. If the desired action for the content is not allowed, the content is not loaded. If the desired action is allowed, the content is loaded to the portable device.

Then, the portable device may only required to process the rights watermark, which is efficient to retrieve and embed, for future actions. The portable section would check for the rights watermark 120 if the rights watermark 120 contained information the portable device is required to understand, such that the portable device can intelligently (i.e. based upon an rules engine) decide how to act upon the content. For example, utility patent application Ser. No. 09/522,312 (U.S. Pat. No. 6,868,497) entitled "Method and apparatus for automatic ID management" submitted on Mar. 9, 2000 by Levy (included herein by reference), requires that the portable section (i.e. portable player) requires the user ID contained in the rights watermark such that the portable section can track usage and intelligently limit it to a specified number of users, while allowing all content to be previewed.

Finally, this invented process can be used to restrict copying and/or playing of the content. Since this content is easily created by individuals and desired to exist on storage in general purpose computers, it is preferred to use the invention to restrict playing.

FIG. 4 shows the hardware apparatus required to implement the invented processes, such as embedding and detecting the protect watermark 110 and rights watermark 120. The hardware includes a logic processor 400 and a storage unit 410. The logic processor 400 may be defined as the equivalent of a digital signal processor (DSP), general-purpose central processing unit (CPU), or a specialized CPU, including media processors. A likely DSP chip is one of the Texas Instruments TMS320 product line. A CPU could include one of Intel's Pentium line or Motorola/IBM's PowerPC product line. The design is simple for someone familiar with the state of the art given the above pseudocode and description. The storage unit 410 includes RAM when using a digital processor.

In addition, a person familiar with the state of the art could implement the process with analog and digital circuitry, either separate or in an application specific integrated circuit (ASIC). The analog and digital circuitry could include any combination of the following devices: a digital-to-analog converter (D/A), comparators, sample-and-hold circuits, delay elements, analog-to-digital converter (A/D), and programmable logic controllers (PLC).

The foregoing descriptions of the preferred embodiments of the invention have been presented to teach those skilled in the art how to best utilize the invention. Many modifications and variations are possible in light of the above teaching. For example, even though this invention discusses audio and the Internet, it is extendable to other types of content and distribution. To this end, the following claims define the scope and spirit of the invention.

What is claimed is:
1. A method comprising:
obtaining data representing audio or video content;
using an electronic logic processor, embedding a protect watermark in the data, the protect watermark providing an indication that the data is protected;
using an electronic logic processor, embedding a rights watermark in the data, the rights watermark providing an indication of user rights associated with rendering the audio or video content, in which the protect watermark is more difficult to remove from the data relative to the rights watermark; and reproducing the audio or video content after said acts of embedding a protect watermark in the data and embedding a rights watermark in the data.

2. The method of claim 1 in which the rights watermark includes a link between the data and at least one of a user, player, recorder or storage device.

3. The method of claim 2 in which the link determines if the user may copy or play the content.

4. The method of claim 1 in which the protect watermark is embedded prior to embedding the rights watermark.

5. The method of claim 1 in which said embedding the protect watermark in the data is more computationally intense relative to said embedding the rights watermark in the data.

6. An electronic logic processor programmed to perform the method of claim 1.

7. A method comprising:
    obtaining data representing audio or video content, in which the data includes a protect watermark embedded therein, the protect watermark providing an indication that the data is protected, and in which the data further includes a rights watermark embedded therein, the rights watermark providing an indication of user rights associated with rendering the audio or video content, the protect watermark being more difficult to remove from the data relative to the rights watermark;
    using an electronic logic processor, analyzing the data to retrieve the protect watermark only when the rights watermark does not exist in the data.

8. An electronic logic processor programmed to analyze the data according to the method of claim 7.

9. An apparatus comprising:
    electronic memory for storing data representing audio or video content;
    an electronic logic processor programmed for:
        embedding a protect watermark in the data, the protect watermark providing an indication that the data is protected;
        embedding a rights watermark in the data, the rights watermark providing an indication of user rights associated with rendering the audio or video content, in which the protect watermark is more difficult to remove from the data relative to the rights watermark; and
        reproducing the audio or video content after said embedding a protect watermark in the data and embedding a rights watermark in the data.

10. The apparatus of claim 9 in which the rights watermark includes a link between the data and at least one of a user, player, recorder or storage device.

11. The apparatus of claim 10 in which the link determines if the user may copy or play the content.

12. The apparatus of claim 9 in which the protect watermark is embedded prior to embedding the rights watermark.

13. The apparatus of claim 9 in which said embedding the protect watermark in the data is more computationally intense relative to said embedding the rights watermark in the data.

14. The apparatus of claim 9 in which said electronic logic processor is operating to perform at least one of embedding a protect watermark in the data, embedding a rights watermark in the data, or reproducing the audio or video content.

15. An apparatus comprising:
    electronic memory for storing data representing audio or video content, in which the data includes a protect watermark embedded therein, the protect watermark providing an indication that the data is protected, and in which the data further includes a rights watermark embedded therein, the rights watermark providing an indication of user rights associated with rendering the audio or video content, the protect watermark being more difficult to remove from the data relative to the rights watermark;
    an electronic logic processor programmed for analyzing the data to retrieve the protect watermark only when the rights watermark does not exist in the data.

16. The apparatus of claim 15 in which said electronic logic processor is operating to analyzing the data.

17. An electronic logic processor programmed to perform the method of claim 2.

18. An electronic logic processor programmed to perform the method of claim 3.

19. An electronic logic processor programmed to perform the method of claim 4.

20. An electronic logic processor programmed to perform the method of claim 5.

* * * * *